United States Patent

[11] 3,583,308

| [72] | Inventor | Willie L. Williams<br>492 Douglas St., San Francisco, Calif. 94114 |
|---|---|---|
| [21] | Appl. No. | 854,121 |
| [22] | Filed | Aug. 29, 1969 |
| [45] | Patented | June 8, 1971 |

[54] APPARATUS FOR HEATING AND DISPENSING WATER FOR COFFEE MAKERS
5 Claims, 1 Drawing Fig.

[52] U.S. Cl. .................................................. 99/302, 222/146
[51] Int. Cl. .................................................. A47j 31/34
[50] Field of Search .................................................. 99/302, 300, 307; 222/146, 146 HE

[56] References Cited
UNITED STATES PATENTS
2,935,011  5/1960  Perlman .................. 99/302X
3,247,778  4/1966  Davis ...................... 99/302
3,295,998  1/1967  Goros ...................... 99/302

*Primary Examiner*—Robert W. Jenkins
*Attorney*—Julian Caplan

ABSTRACT: A coffee making device for use in aircraft and similar installations has a water-heating cylinder into the top of which cold water flows. A piston reciprocates in the cylinder and has a check valve. The piston is biased to "up" position by a spring. When the piston is up, the check valve is normally closed. When water is dispensed through a dispenser valve from the bottom of the cylinder, cold water flows into the top, depressing the piston to force out hot water, the piston acting as a thermal barrier between the hot and cold water. When the cylinder is empty, the dispenser valve is closed and the check valve opened permitting cold water to fill the cylinder. The spring returns the piston to "up" position and the check valve is closed.

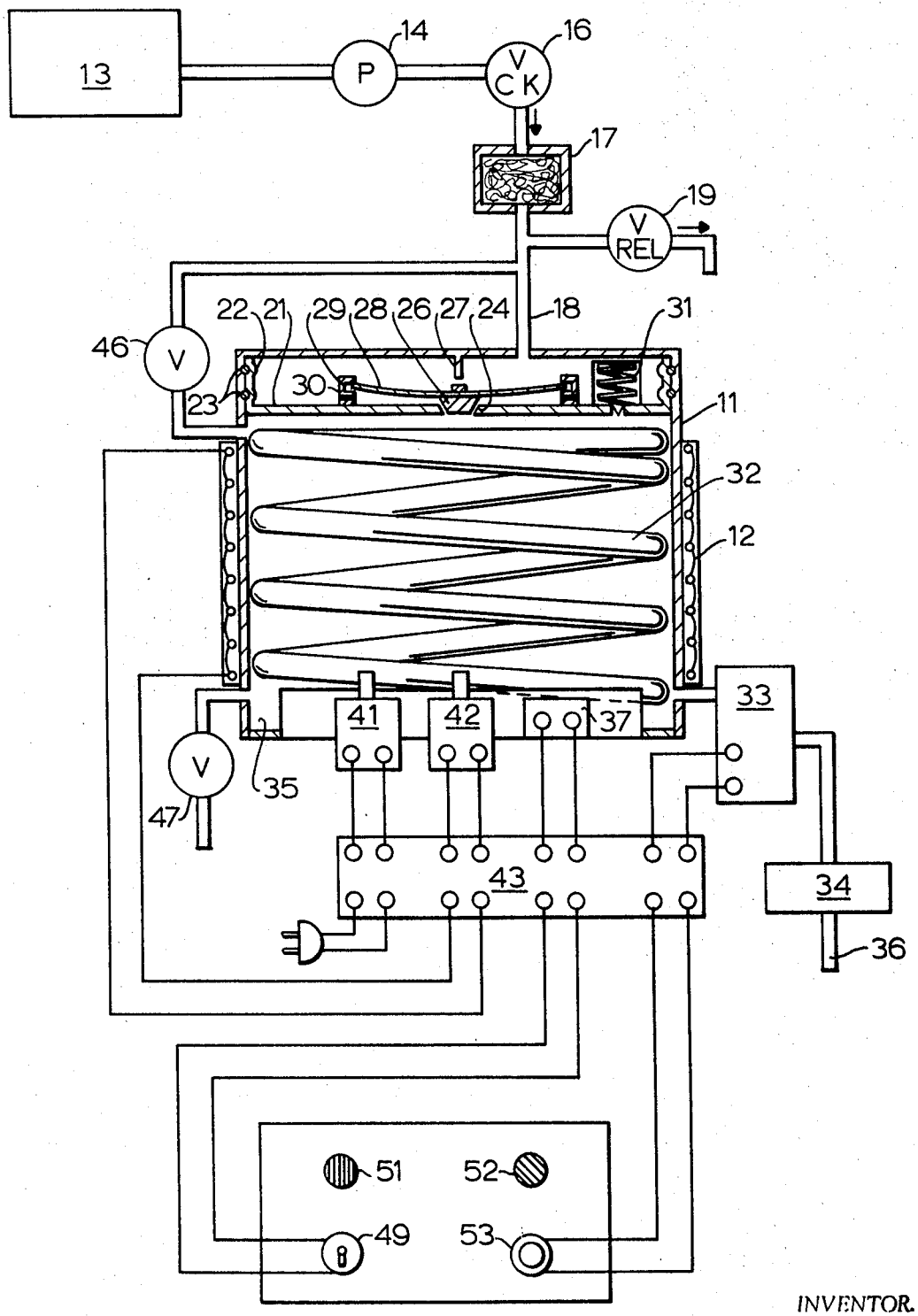

APPARATUS FOR HEATING AND DISPENSING WATER FOR COFFEE MAKERS

This invention relates to a new and improved apparatus which heats water and then dispenses same through a coffee making apparatus using the pressure of incoming cold water to dispense the hot water while continuously separating the cold water from the hot water. Previous apparatus of this general type has used the pressure of the incoming cold water to dispense the hot water but has mixed the cold water with the hot water thereby reducing the temperature of the water dispensed and requiring that the heating element operate at a higher temperature in order to produce a temperature of the desired level. It will be understood that in a common type of coffee maker the hot water is forced through perforations in a can of coffee grounds and hence that there is considerable resistance to the flow of water. Where speed is essential, the water must be forced through the grounds under considerable pressure. The present invention provides a means whereby the pressure in the incoming cold water line dispenses the hot water despite considerable resistance to the flow of the hot water.

Another feature of the invention is the fact that means is provided for automatically allowing the incoming cold water to fill the heating tank and then close off communication between the interior of the tank and the cold water line until the water has been heated and fully dispensed, whereupon communication is again established between the incoming cold water line and the interior of the tank.

Still another feature of the invention is the provision of means for initially filling the tank and draining the same.

Other objects of the present invention will become apparent upon reading the following specification and referring to the accompanying drawings in which similar characters of reference represent corresponding parts in each of the several views.

In the drawings:

The single FIGURE is a combined schematic and vertical sectional view of a portion of the apparatus hereinafter described in detail.

The apparatus of the present invention employs a closed tank 11 within which the water is heated by means of heating coils 12. Cold water is introduced into the top of tank 11 from a storage tank 13 by gravity, or optionally, by means of a pump 14 which delivers the water through a check valve 16 and filter 17 into the intake port 18 of tank 11. A pressure release valve 19 opens to discharge water when the pressure exceeds a safe level.

Reciprocable within the interior of tank 11 is a piston 21 having a cylindrical flange 22 which seals against the inner wall of tank 11 by means of piston rings 23. An aperture 24 is formed in the top of piston 21 which is closed by a plug 26. Plug 26 is fixed to overcenter spring disc 28. When piston 21 reaches the top of tank 11, stud 27 depending from the top pushes down on disc 28, forcing it into the concave-upward position shown in the drawing. Disc 28 tends to hold plug 26 in closed position when the parts are in the relation shown in the drawing. However, when the plug 26 is pushed upward as hereinafter explained, the disc 28 snaps from concave downward position illustrated to a convex upward position which tends to hold the plug 26 open. To accommodate the snap movement of disc 28, the same is loosely engaged in inward facing slots 29 in studs 30 fixed to the piston 21. A pressure release valve 31 which is normally closed will be forced open when the pressure within tank 11 exceeds a safe level. Fitting within tank 11 is a helical coil spring 32 which rests upon the bottom of the tank and biases piston 21 to the top of the tank. When, however, the piston 21 is forced to the bottom of the tank, the spring 32 is compacted, there being space 35 at the bottom of the tank to accommodate the compacted spring.

Connected to the bottom of the tank 11 is a solenoid-actuated valve 33. In closed position valve 33 prevents discharge of water from tank 11 and when in open position it permits the water to flow through a chamber 24 and out through a spigot 36. As is well understood in this art, the compartment 34 may comprise means for holding a can of coffee grounds, the top and bottom of the can being perforated to permit hot water to flow through the grounds to make coffee. A thermostatic control 37 located in the bottom or some other convenient location relative to tank 11 controls the heating coil 12 so that the temperature of the water in tank 11 is maintained below a maximum temperature.

Located in the bottom of tank 11 is a microswitch 41 which is contacted by the piston 21 in down position. Also in the bottom of tank 11 immediately below plug 26 is a solenoid-actuated plunger 42. When the plunger 42 is energized when the piston is at the bottom of its stroke, it forces plug 26 upwardly until disc 28 springs to up position holding the plug 26 open. A relay 43, the details of which form no part of the present invention, controls the system as is explained in the description of operation.

To initially fill the tank 11, drain valve 47 is open and valve 46 which bypasses the upper end of the tank is likewise open. Air is eliminated through valve 47 and cold water is introduced through valve 46 to fill the tank. Both valves 46 and 47 are then closed and remain closed during normal operation of the device. When the entire operation is completed, the tank 11 may be drained of water through valve 47. After tank 11 has been filled with cold water, switch 49 is turned on which energizes heating coil 12 and the temperature of the water is brought up to the desired level as sensed by thermostatic control switch 37 which causes the red light 51 to be extinguished and the green light 52 to be illuminated. This indicates to the operator that the tank is up to desired temperature. Meanwhile, a perforated can of coffee has been installed in the chamber 34. When it is desired to dispense coffee, the operator pushes the button 53 and this opens valve 33. The force of water coming through port 18 pushes the piston 21 downward forcing the water out through valve 33 and thence through compartment 34 and out of spigot 36. It is important to note that the piston 21 constitutes a thermal barrier between the cold incoming water entering through port 18 through the top of tank 11 and the hot water which is below the piston. When the piston 21 reaches down position and all of the hot water has been dispensed, it contacts microswitch 41. The relay 43 then causes valve 33 to close and also causes plunger 42 to be energized which forces the plug 26 up so that disc 28 snaps into convex upward position holding plug 26 open. Spring 32 then returns piston 21 to up position, the incoming water flowing through apertures 24 to fill the tank 11. At the top of the stroke of piston 21 the post 27 depresses disc 28 so that it snaps to concave downward position and plug 26 closes the opening 24. The water that has now been admitted to tank 11 is heated by heating coils 12 and when fully heated the dispensing of water is again available.

What I claim is:

1. Apparatus for heating and dispensing hot water comprising a tank, heating means for said tank, a piston reciprocable in said tank, means biasing said piston to first position, a piston valve in said piston movable between open position establishing fluid communication through said piston and closed position, a cold water inlet admitting cold water under pressure to the first position end of said tank, an outlet valve at the second position end of said tank opposite said first position, first means for closing said piston valve after said piston has reached first position, and second means for opening said piston valve after said piston has reached second position.

2. Apparatus according to claim 1 in which said piston valve comprises an overcenter, spring operated check valve.

3. Apparatus according to claim 1 which further comprises a switch at the second end of said tank positioned to be contacted by said piston as it reaches said second end, said outlet valve being electrically actuated, said switch controlling said outlet valve to close said outlet valve when said piston reaches second position and means for opening said outlet valve.

4. Apparatus according to claim 3 in which said second means is electrically actuated, said switch controlling said second means.

5. Apparatus according to claim 1 which further comprises a chamber for a perforated container of ground coffee communicating with said outlet valve.